(12) United States Patent
Hinz et al.

(10) Patent No.: US 7,963,619 B2
(45) Date of Patent: Jun. 21, 2011

(54) HYDRAULIC UNIT

(75) Inventors: Axel Hinz, Neu-Anspach (DE);
Günther Vogel, Dreieich (DE); Rene Lénz, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1055 days.

(21) Appl. No.: 11/792,150

(22) PCT Filed: Nov. 24, 2005

(86) PCT No.: PCT/EP2005/056184
§ 371 (c)(1),
(2), (4) Date: May 31, 2007

(87) PCT Pub. No.: WO2006/058859
PCT Pub. Date: Jun. 8, 2006

(65) Prior Publication Data
US 2008/0106145 A1 May 8, 2008

(30) Foreign Application Priority Data

Dec. 2, 2004 (DE) .......................... 10 2004 058 329
Jun. 1, 2005 (DE) .......................... 10 2005 024 979

(51) Int. Cl.
*B60T 8/36* (2006.01)
*B60T 13/74* (2006.01)

(52) U.S. Cl. .............................. 303/119.3; 303/DIG. 10
(58) Field of Classification Search ............... 303/116.1, 303/119.1, 119.2, 119.3, DIG. 10, DIG. 11
See application file for complete search history.

(56) References Cited

U.S. PATENT DOCUMENTS

| | | | |
|---|---|---|---|
| 5,244,262 A * | 9/1993 | Kehl et al. | 303/119.3 |
| 6,270,170 B1 * | 8/2001 | Isogai et al. | 303/119.3 |
| 6,398,315 B1 | 6/2002 | Dinkel et al. | |
| 6,688,707 B1 * | 2/2004 | Dinkel et al. | 303/119.3 |
| 2003/0066720 A1 | 4/2003 | Sakamoto | |

FOREIGN PATENT DOCUMENTS

| | | |
|---|---|---|
| DE | 197 01 940 A1 | 7/1997 |
| DE | 102 28 563 A1 | 1/2004 |
| EP | 0 636 525 A2 | 2/1995 |
| EP | 1 194 321 B1 | 4/2002 |

OTHER PUBLICATIONS

Patent Abstract of Japanese Publication No. 02011448 A dated Jan. 16, 1990.

* cited by examiner

*Primary Examiner* — Melody M Burch
(74) *Attorney, Agent, or Firm* — RatnerPrestia

(57) ABSTRACT

A hydraulic unit for a slip-controlled brake system, comprising an accommodating member accommodating inlet and outlet valves in several valve accommodating bores. The inlet and outlet valves thereof being necessary for brake slip control are arranged in one single valve row (X) in a particularly space-saving fashion.

9 Claims, 4 Drawing Sheets

HYDRAULIC UNIT

This application is the U.S. national phase application of PCT International Application No. PCT/EP2005/056184, filed Nov. 24, 2005, which claims priority to German Patent Application No. DE102004058329.3, filed Dec. 2, 2004 and German Patent Application No. DE102005024979.5, filed Jun. 1, 2005, the contents of such applications being incorporated by reference herein.

BACKGROUND OF THE INVENTION

The present invention relates to a hydraulic unit for a slip-controlled brake system, in particular for use in a motorcycle.

EP 1 194 321 B1 discloses a hydraulic unit of the type mentioned above. The hydraulic unit is composed of a block-shaped accommodating member accommodating inlet and outlet valves in several valve accommodating bores of a first and second valve row for the purpose of anti-lock control. Besides, a pump bore is arranged in the accommodating member, which is aligned transversely to the port where the valve accommodating bores open into the accommodating member, including a motor accommodating bore aligned normal to the pump bore, as well as several pressure fluid channels, which connect the valve accommodating bores and the pump bore and are able to establish a hydraulic connection between the brake pressure generator connections that open into the accommodating member and several wheel brake connections.

SUMMARY OF THE INVENTION

An object of the invention is to reduce the overall dimensions of the accommodating member and the manufacturing effort for the arrangement of the pressure fluid channels in the accommodating member in a hydraulic unit of the indicated type, and to adapt it for use in a motorcycle without having to accept shortcomings in terms of the brake control function. This object is achieved for a hydraulic unit of the indicated type as described herein.

Further features, advantages and possible applications of the invention can be seen in the following by way of the description of an embodiment by way of several accompanying drawings.

DETAILED DESCRIPTION OF THE PREFERRED EMBODIMENTS

Figure 1:
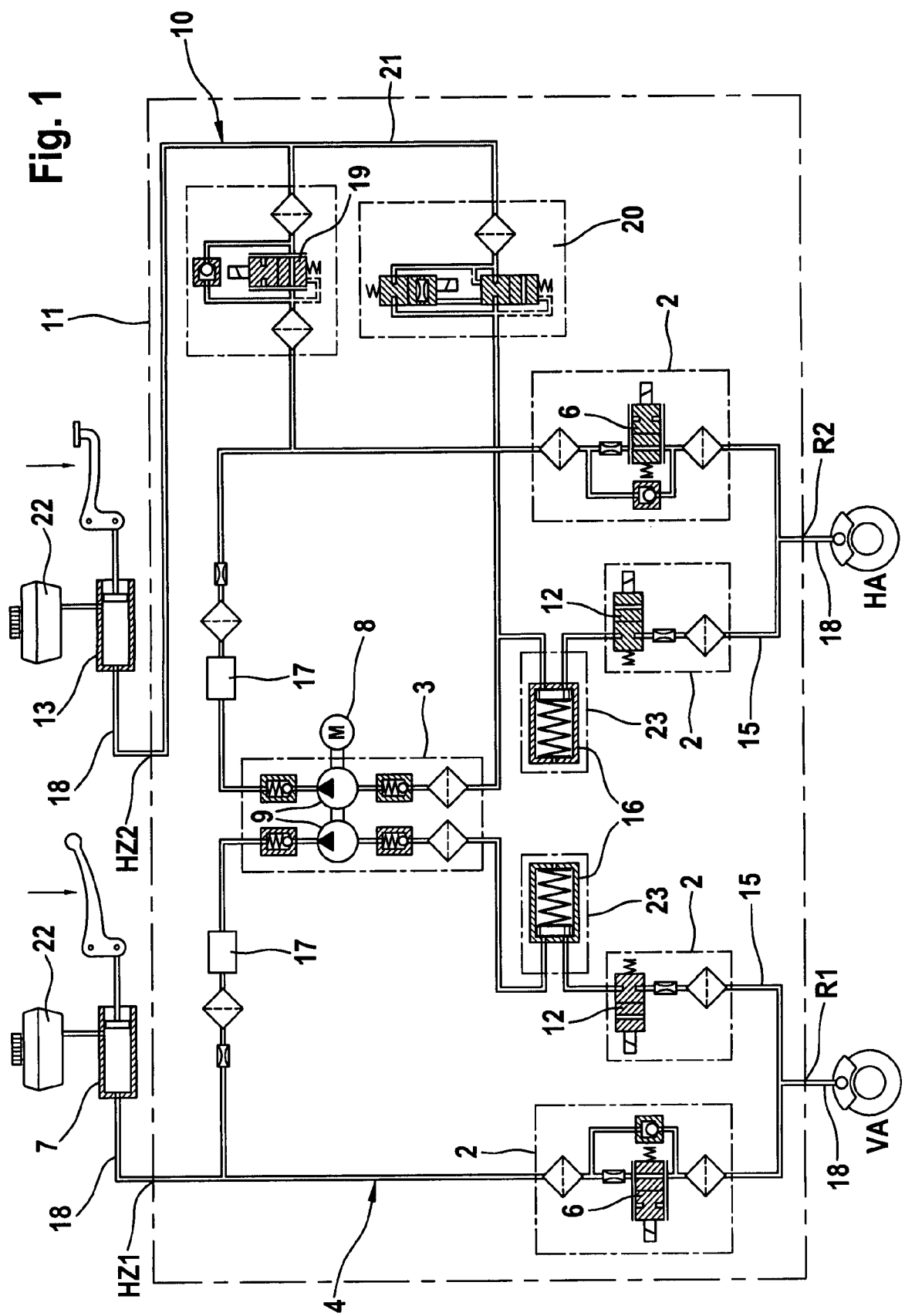
FIG. 1 shows a hydraulic circuit diagram for a hydraulic unit inhering the features of the invention.

FIG. 1 shows the hydraulic circuit diagram for a motorcycle brake system for better comprehension of the accommodating member 11 illustrated in the subsequent Figures. The brake system comprises a hydraulically operable front-wheel and rear-wheel brake circuit 4, 10, with each one master brake cylinder 7 connected to the front-wheel brake circuit 4 and operable proportionally by manual force and a master brake cylinder 13 at the rear-wheel brake HA that is operable proportionally to leg force.

For brake slip control, electromagnetically operable inlet and outlet valves 6, 12 are fitted in the front-wheel and rear-wheel brake circuits 4, 10, and the inlet valve 6 that is open in its basic position is inserted in each case into the brake line of the front-wheel or rear-wheel brake circuit 4, 10, which connects the associated master brake cylinder 7, 13 to the front-wheel or rear-wheel brake VA, HA, respectively. The outlet valve 12 that is closed in its basic position is respectively inserted into a return line 15 of each brake circuit, which connects the front-wheel or rear-wheel brakes VA, RA with respectively one low-pressure accumulator 16 and the suction side of a dual-circuit pump 9, which operates according to the return principle. The pump 9 is in connection with the brake lines 18 by way of noise-damping chambers 17 inserted into the two brake circuits so that a return delivery of the brake fluid volume discharged in each case from the front-wheel or rear-wheel brake VA, HA is safeguarded in conformity with requirements.

Figure 6:
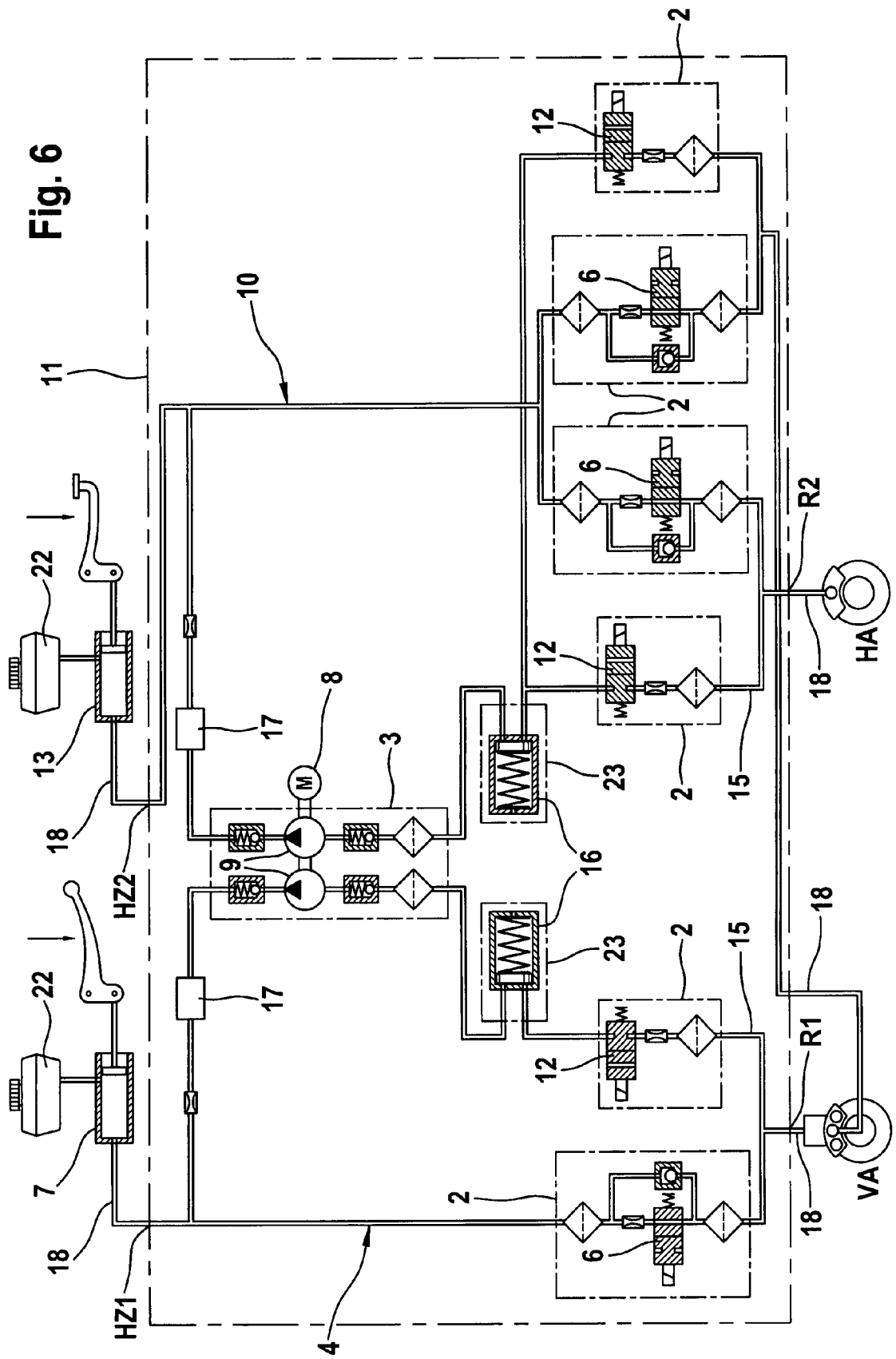
FIG. 6 is an extension of functions of the hydraulic circuit of FIG. 1 by another pressure control channel, which is realized in the accommodating member by additional pressure fluid channels that allow a connection between two further valve accommodating bores and the front-wheel brake, maintaining the idea of the invention.

Different from FIG. 1, another brake line 18 that leads to the front-wheel brake VA is connected in addition to the rear-wheel brake circuit 10 in FIG. 6, so that when the master brake cylinder 13 connected to the rear-wheel brake circuit 10 is actuated, favorably, its brake pressure is effective at the front-wheel brake VA as well. Besides, the additional brake line 18 includes the circuit arrangement according to the return principle, as known from FIG. 1, for a pair of additional inlet and outlet valves 6, 12 in order to prevent locking at the front-wheel brake VA as well when the rear-wheel brake circuit 10 is operated.

The inlet and outlet valves 6, 12 are designed as binary seat valves corresponding to the circuit diagrams of FIGS. 1 and 6. Upon request or requirement, these valves can also be driven as proportional control valves, to what end appropriate pressure sensors are employed, which sense the respectively prevailing pressure in the wheel brakes and the pressure introduced by the master cylinders 7, 13.

Based on the circuit diagram illustrated in FIG. 1, the features of the invention will now be explained by way of FIGS. 2 to 5.

Figure 2:
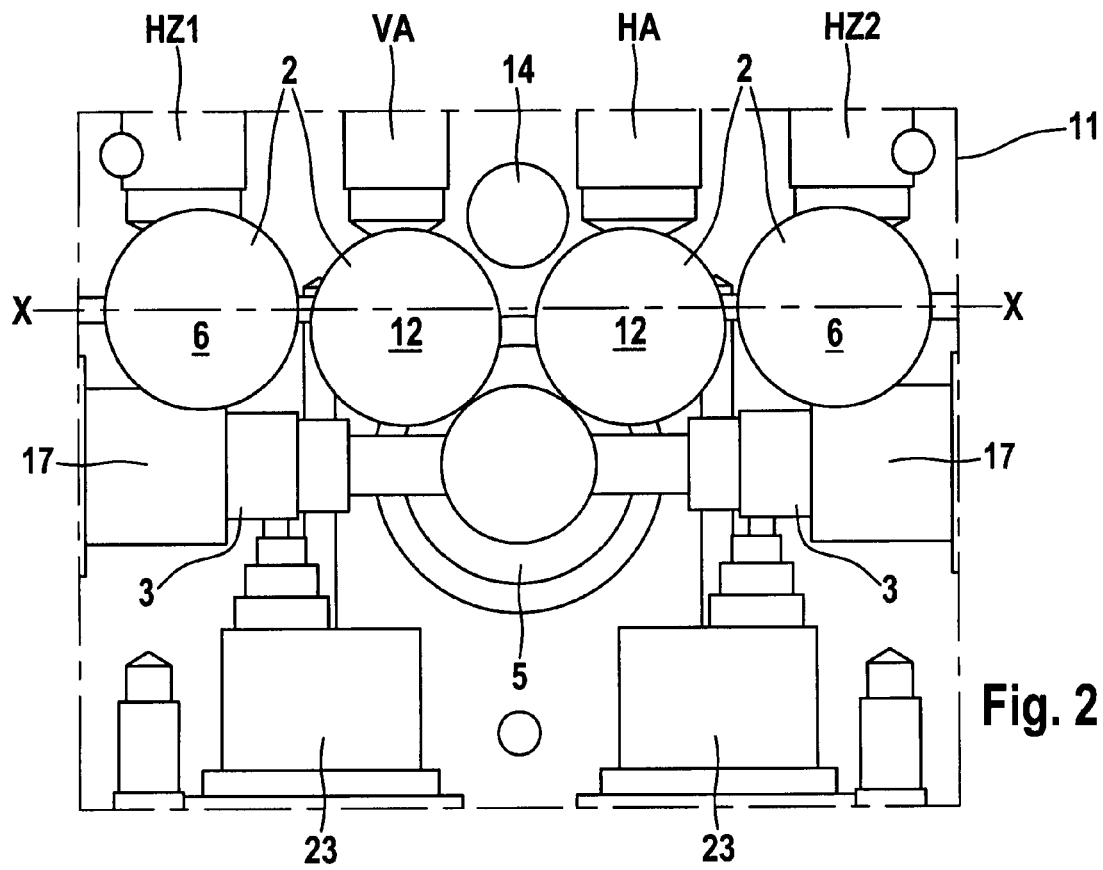
FIG. 2 shows the accommodating member provided for the hydraulic unit of FIG. 1 in a top view of the valve accommodating bores.
Figure 3:
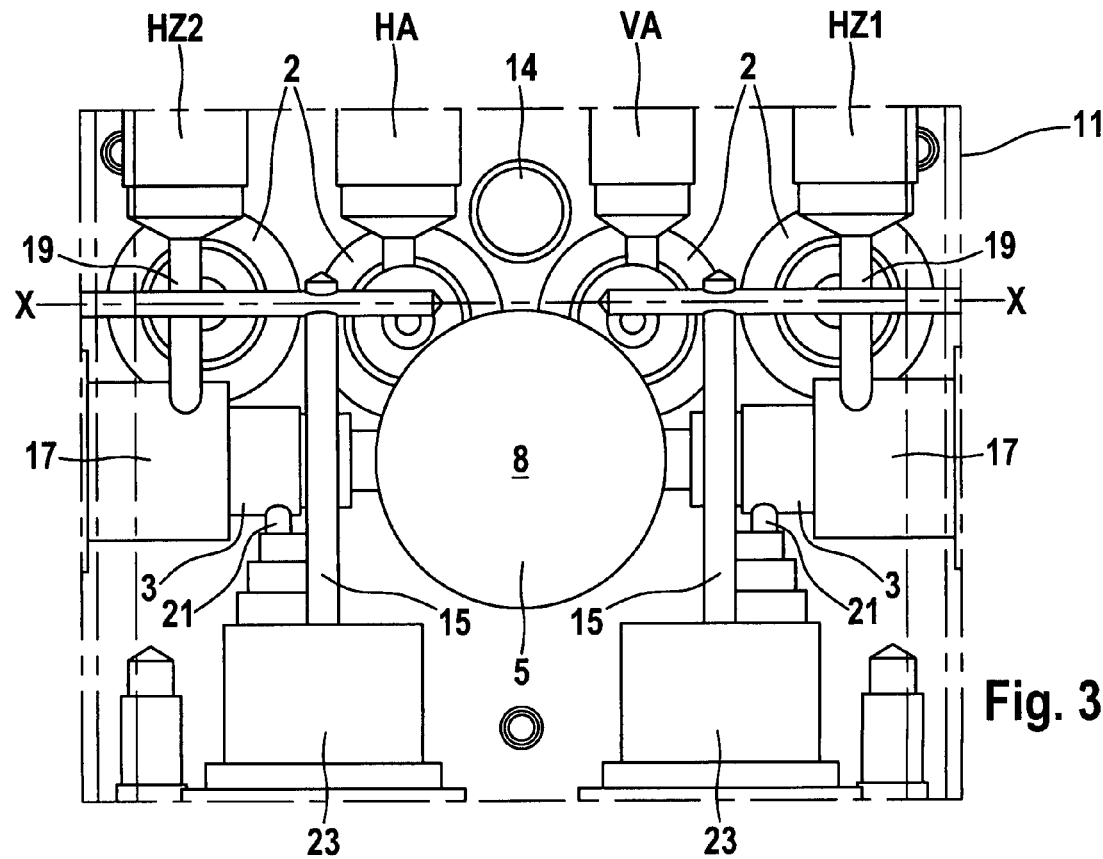
FIG. 3 shows the accommodating member according to FIG. 2, turned by 180 degrees, in a top view of the motor accommodating bore.
Figure 4:
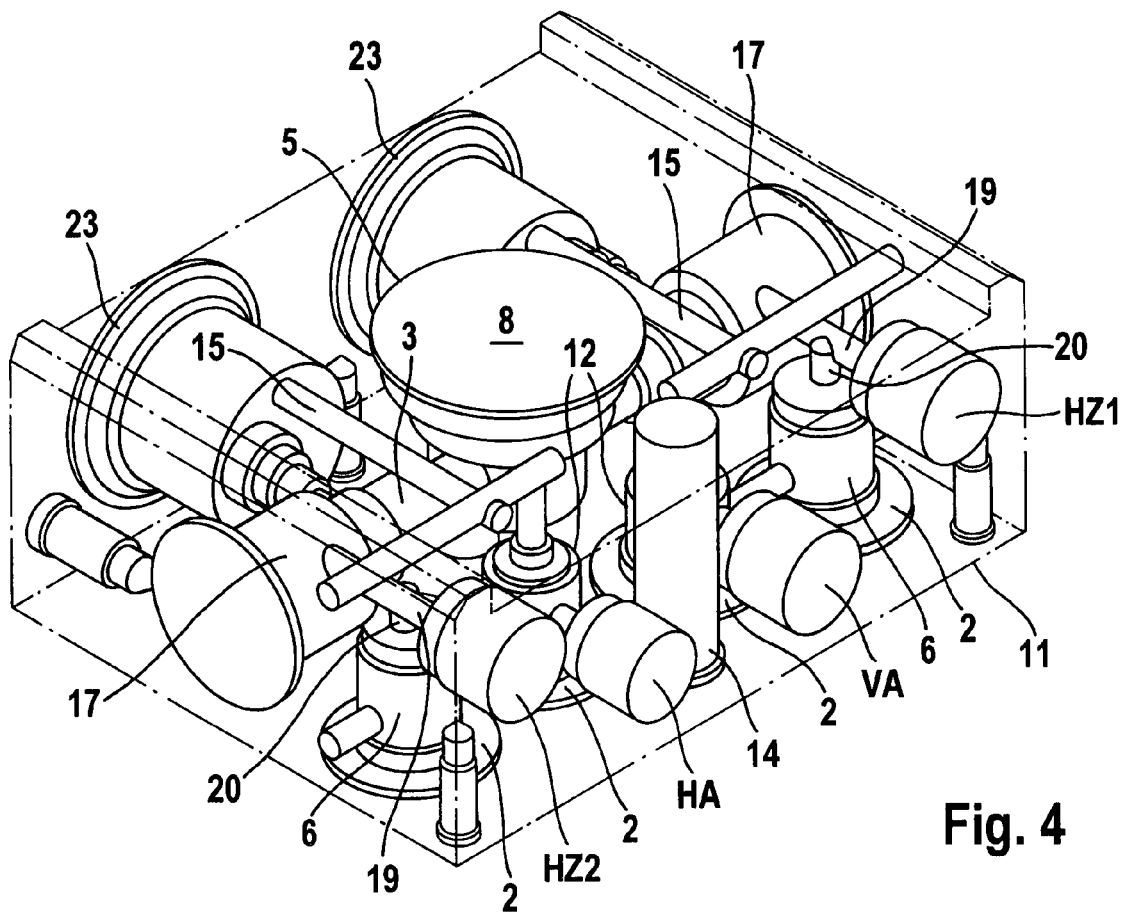
FIG. 4 is a perspective view of the accommodating member.
Figure 5:
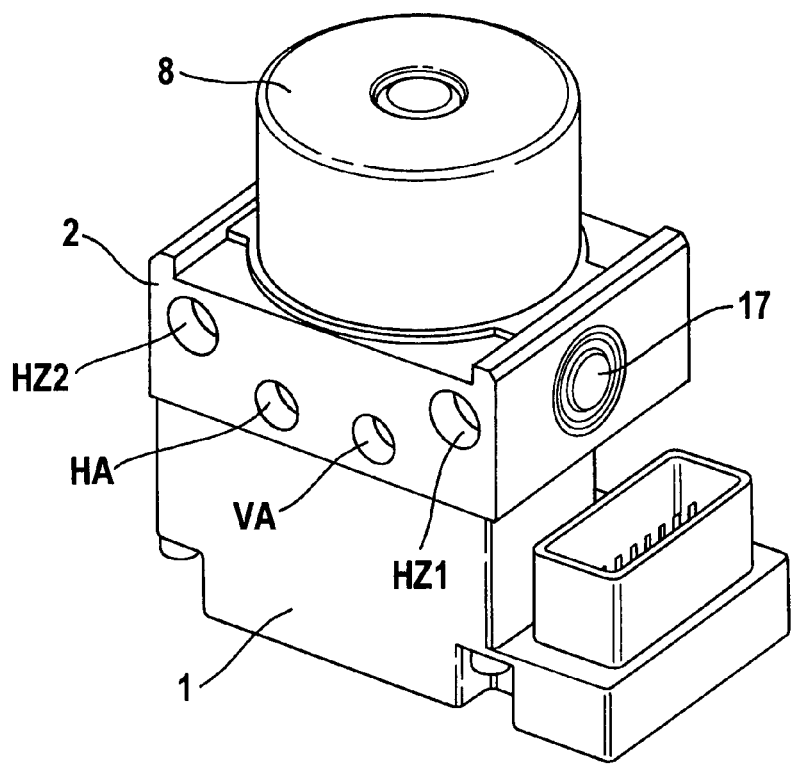
FIG. 5 is a total view of the hydraulic unit equipped with all function elements.

FIGS. 2 to 4 show different views of the features of a hydraulic unit for use in the brake-slip controlled motorcycle brake system, equipped with a block-shaped accommodating member 11 which accommodates the inlet and outlet valves 6, 12 in four valve accommodating bores 2 of one single valve row X. A pump bore 3 arranged in the accommodating member 11 is directed transversely to the direction of the valve accommodating bores 2 opening into the accommodating member. Further, the accommodating member 11 includes a motor accommodating bore 5 for the electric motor 8, which is directed perpendicular to the pump bore 3 at half the length of the pump bore. In addition, several pressure fluid channels that connect the valve accommodating bores 2 and the pump bore 3 are provided, which are able to constitute a hydraulic connection between two brake pressure connections HZ1, HZ2 that open into the accommodating member 11, and two wheel brake connections VA, HA.

As depicted by way of FIGS. 2 to 4, the invention provides that the inlet and outlet valves 6, 12 are arranged in one single valve row X, and the inlet and outlet valves 6, 12 are controllable electromagnetically by a control unit 1, which is mounted onto the accommodating member 11 exclusively in the area of the only valve row X. Favorably, this safeguards a particularly slim contour of the accommodating member 11, which is adapted to the mounting conditions of a motorcycle. With regard to the mentioned arrangement of the control unit 1 at the accommodating member 11, reference is made to the overall view of the hydraulic unit in FIG. 5.

Further, it becomes apparent from FIGS. 2 to 4 that the outlet valves 12 are arranged between the inlet valves 6 in the only valve row X, which is arranged in parallel to the pump bore 3, whereby easy-to-make channel bores are achieved for the hydraulic connection of the outlet valves 12 to the low-pressure accumulator bores 23 and the valve accommodating bores 2 of the inlet valves 6.

Advantageously, the valve accommodating bores 2 provided for the inlet valves 6 open into the accommodating member 11 directly adjacent to the pump bore 3, thereby rendering possible a short channel connection between the pressure connection HZ1, HZ2 and the noise damping chamber 17 respectively designed at the outward end of the pump bore 3.

Due to the arrangement of the inlet and outlet valves 6, 12 in one single valve row X, the valve accommodating bores 2 provided for the outlet valves 12 open into the accommodating member 11 directly adjacent to the wheel brake connections VA, HA, allowing likewise the channel bores that are necessary for the outlet valves 12 to be designed as short as possible.

Thus, the wheel brake connections VA, HA are arranged between a pair of brake pressure generator connections HZ1, HZ2, which can be acted upon hydraulically separately of each other by means of two brake pressure generators 7, 13 which are operable independently of each other.

In addition, the accommodating member 11 includes a through-bore 14 between the two wheel brake connections VA, HA for the electrical contacting of the control unit 1 with the electric motor 8 that is inserted into the motor accommodating bore 5.

The pump bore 3 is arranged between the valve row X accommodating the inlet and outlet valves 6, 12 and a pair of pressure accumulator bores 23, which open into the accommodating member 11 transversely to the pump bore and the valve accommodating bores 3, 2.

It can clearly be seen in FIGS. 3 and 4 that the two brake pressure generator connections HZ1, HZ2 are in connection with the noise damping chambers 17 adjoining to the pump bore 3 through two pressure fluid channels 19 that open radially, preferentially tangentially, into the pump bore 3 downstream of the pump pressure valves.

As can be taken from FIG. 4, each pressure fluid channel 19 includes a branch 20 leading to one of the two valve accommodating bores 2 of each brake circuit, which are arranged in each case at the end of the valve row X in order to accommodate the inlet valves 6.

As the noise damping chambers 17 are arranged in the diametrically positioned ends of the pump bore 3, both the noise damping chambers 17 and the pump bore 3 can be closed in a pressure-fluid-tight manner by means of closing members, which are mounted from the outside into the two lateral surfaces of the accommodating member 11. The pump bore 3, which penetrates the accommodating member 11 at right angles relative to the two low-pressure accumulator bores 23, for each pump circuit, is in connection to the two parallel aligned low-pressure accumulator bores 23 by way of a pump suction channel 21.

Due to the stepped bottom of each low-pressure accumulator bore 23, the pump suction channels 21 have a particularly short design, wherein a pump suction valve (non-return valve) is inserted in each case.

Further, the bottom of each low-pressure accumulator bore 23 includes for each brake circuit a return line 15, which is aligned transversely to the valve row X in the accommodating member 11 and which extends as a straight bore through the bottom of each low-pressure accumulator bore 23 to the valve accommodating bore 2 of the outlet valve 12. In the present embodiment, the return line 15 is continued in the plane of the valve row X as an angled-off channel in the direction of the valve accommodating bore 2 of each one brake circuit provided for the outlet valve 12.

In consideration of a slimmest possible type of construction of the accommodating member 11, the arrangement of the outlet valves 12 between the inlet valves 6 in the valve row X allows short and, thus, easy-to-make return lines 15, which minimize the clearance volume for the improved bleeding and filling of the secondary circuits of the brake system with brake fluid, thereby simplifying the evacuation and filling process that is necessary for the first filling of the hydraulic unit. The term 'secondary circuit' refers to the channel connections that exist between the normally closed outlet valves 12, the low-pressure accumulators 16, and the pump bore 3.

Finally, the valve accommodating bores 2, the pump bore 3, and the low-pressure accumulator bores 23, as illustrated and described, are aligned to each other in the accommodating member 11 in such a fashion that the expenditure in closure plugs needed to seal the pressure fluid channels at the outside surfaces of the accommodating member 11 is insignificant.

The invention claimed is:

1. A hydraulic unit for a slip-controlled brake system comprising:
    an accommodating member accommodating inlet and outlet valves in several valve accommodating bores;
    a pump bore arranged in the accommodating member and being aligned transversely to the direction of the valve accommodating bores opening into the accommodating member;
    a motor accommodating bore for an electric motor, which is directed perpendicular to the pump bore;
    a plurality of pressure fluid channels which connect the valve accommodating bores and the pump bore and establish a hydraulic connection between two brake pressure generator connections that open into the accommodating member and at least two wheel brake connections,
    wherein every inlet valve and every outlet valve are arranged together in one single valve row (X).
2. The hydraulic unit as claimed in claim 1,
    wherein the inlet and outlet valves are electromagnetically drivable by a control unit which is arranged on the single valve row (X) of the accommodating member.
3. The hydraulic unit as claimed in claim 1,
    wherein the outlet valves are arranged between the inlet valves in the single valve row (X).
4. The hydraulic unit as claimed in claim 1,
    wherein the valve row (X) is arranged in parallel to the pump bore, and the valve accommodating bores provided for the inlet valves open into the accommodating member directly adjacent to the pump bore.

5. The hydraulic unit as claimed in claim 1, wherein the valve accommodating bores provided for the outlet valves open into the accommodating member directly adjacent to the wheel brake connections.

6. The hydraulic unit as claimed in claim 1, wherein the wheel brake connections are arranged between the pair of brake pressure generator connections which are configured to be connected to two brake pressure generators being operable independently of each other.

7. The hydraulic unit as claimed in claim 1, wherein the accommodating member includes a through-bore between the two wheel brake connections for the electrical contacting of a control unit with an electric motor inserted into the motor accommodating bore.

8. The hydraulic unit as claimed in claim 7, wherein the through-bore is closed by the control unit.

9. The hydraulic unit as claimed in claim 1, wherein the pump bore is arranged between the valve row (X) accommodating the inlet and outlet valves and a pair of pressure accumulator bores which open into the accommodating member transversely to the pump bore and the valve accommodating bores.

* * * * *